(12) United States Patent
Lau et al.

(10) Patent No.: US 8,907,979 B2
(45) Date of Patent: Dec. 9, 2014

(54) FAST RENDERING OF KNOCKOUT GROUPS USING A DEPTH BUFFER OF A GRAPHICS PROCESSING UNIT

(75) Inventors: Cynthia W. Lau, Campbell, CA (US); Alexandre S. Parenteau, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1897 days.

(21) Appl. No.: 11/586,251

(22) Filed: Oct. 24, 2006

(65) Prior Publication Data

US 2013/0120381 A1    May 16, 2013

(51) Int. Cl.
| | |
|---|---|
| *G09G 5/00* | (2006.01) |
| *G09G 5/02* | (2006.01) |
| *G09G 5/36* | (2006.01) |
| *G06T 15/04* | (2011.01) |
| *G09G 5/14* | (2006.01) |
| *G06T 15/40* | (2011.01) |

(52) U.S. Cl.
CPC ...... *G06T 15/04* (2013.01); *G09G 5/02* (2013.01); *G09G 5/14* (2013.01); *G09G 5/363* (2013.01); *G06T 15/405* (2013.01); *G06T 2200/28* (2013.01)
USPC ............ 345/629; 345/592; 345/589; 345/545

(58) Field of Classification Search
USPC .......... 345/419–423, 581, 589, 592, 619, 629
See application file for complete search history.

(56) References Cited

U.S. PATENT DOCUMENTS

| | | | |
|---|---|---|---|
| 6,313,839 B1 * | 11/2001 | Larson | 345/422 |
| 6,819,328 B1 * | 11/2004 | Moriwaki et al. | 345/591 |
| 7,042,467 B1 | 5/2006 | Hamburg | |
| 7,079,151 B1 * | 7/2006 | Rublee | 345/589 |
| 7,102,651 B1 | 9/2006 | Louveaux | |
| 7,151,546 B1 | 12/2006 | Louveaux | |
| 2004/0061699 A1 * | 4/2004 | Tjew | 345/421 |
| 2005/0122338 A1 * | 6/2005 | Hong et al. | 345/546 |
| 2006/0114253 A1 * | 6/2006 | Zitnick et al. | 345/422 |
| 2008/0036763 A1 * | 2/2008 | Chen et al. | 345/422 |

* cited by examiner

*Primary Examiner* — Maurice L McDowell, Jr.
*Assistant Examiner* — Donna J Ricks
(74) *Attorney, Agent, or Firm* — Wolfe-SBMC

(57) ABSTRACT

A method, system, and computer-readable storage medium are disclosed for rendering knockout groups using a graphics processing unit (GPU). Input comprising at least one knockout group may be received at the GPU. The knockout group may comprise a plurality of objects that are ordered by paint order. Each object may be represented in the input by a plurality of vertices. The plurality of objects may be drawn into a frame buffer of the GPU such that a topmost object at each pixel in the frame buffer determines a color and an opacity of the pixel with respect to the other objects in the knockout group. In drawing the plurality of objects of the knockout group into the frame buffer of the GPU, program code may be executed by the GPU.

27 Claims, 8 Drawing Sheets

---

Receive input comprising a knockout group at a GPU
302

↓

Draw the objects of the knockout group into the GPU frame buffer such that a topmost object at each pixel in the frame buffer determines a color and an opacity of the pixel with respect to the other objects in the knockout group
304

FAST RENDERING OF KNOCKOUT GROUPS USING A DEPTH BUFFER OF A GRAPHICS PROCESSING UNIT

BACKGROUND

1. Field of the Invention

The present invention is directed to computer systems; and more particularly, it is directed to utilization of graphics processors associated with computer systems for rendering transparency groups.

2. Description of the Related Art

As the power and complexity of personal computer systems increase, graphics operations and graphical data are likewise increasing in complexity. Graphical data, particularly two-dimensional graphical data, may typically be expressed in a structured format that complies with a particular specification or model for representing such data. Such imaging models may often be implemented across multiple computing platforms to facilitate the exchange of graphical data.

One such specification, the Adobe Portable Document Format (PDF), is the native file format of the Adobe® Acrobat® family of products. By using products that implement the PDF format, users may exchange and view electronic documents in a manner that is substantially independent of the environment in which the documents were created. PDF includes an imaging model that describes text and graphics in a device-independent and resolution-independent manner. The PDF imaging model includes various structures to describe complex two-dimensional graphical data including geometric models and bitmapped images.

The Scalable Vector Graphics (SVG) specification is another model for representing two-dimensional graphical data. SVG includes a modularized XML language for describing two-dimensional graphics and an application programming interface (API) usable for building graphical applications. The World Wide Web Consortium (W3C), a forum for developing interoperable web-based technologies, promulgates the SVG model.

Both the PDF and SVG specifications provide for various types of transparency or alpha compositing in two-dimensional graphics. For example, the PDF specification includes transparency groups. A transparency group includes a sequence of consecutive objects in a transparency stack. The objects may be collected together and composited to produce a single color, shape, and opacity at each point. The result may be treated as if it were a single object for subsequent compositing. In the PDF model, the group may be classified as a knockout group. Similarly, the SVG model provides for complex groups having a knockout property. In a knockout group, each individual element may be composited with the group's initial backdrop rather than with the stack of preceding elements in the group. For objects with binary shapes (e.g., a shape alpha of 1.0 for inside and 0.0 for outside), each object may overwrite (or "knock out") the effect of earlier-drawn (i.e., underlying) elements that it overlaps within the same group. At any given point, only the topmost object enclosing the point contributes to the final color and opacity of the group as a whole. Knockout groups may be useful in composing a piece of artwork from a collection of overlapping objects wherein the topmost object completely obscures objects underneath while interacting with the group's backdrop in a usual manner.

With the PDF specification, an object may have two different alpha properties: opacity alpha and shape alpha. The opacity alpha property defines the opaqueness of the object's color. The shape alpha property defines to what degree the object knocks out earlier-drawn objects in the knockout group.

Prior approaches to rendering knockout groups have been implemented with a CPU and main memory of a computer system. For example, a special frame buffer is allocated that contains an extra alpha channel. The extra alpha channel is used to store the shape alpha for objects in the knockout group. Therefore, the frame buffer for a knockout group may have five channels: red (R), green (G), blue (B), opacity alpha (A), and an extra alpha channel for shape alpha (A2). Objects within a knockout group are drawn from back to front. As each object in the knockout group is drawn, all five channels of the object and all five channels of the previously drawn objects (as stored in the frame buffer) are used to calculate the final color at any given point. The shape alpha property of the object determines how much the object knocks out the previously drawn objects.

SUMMARY

Various embodiments of systems, methods, and computer-readable storage media for rendering knockout groups using a graphics processing unit (GPU) are disclosed. According to one embodiment, input comprising at least one knockout group may be received at the GPU. The knockout group may comprise a plurality of objects that are ordered by paint order. The objects in the knockout group may be composited with an initial background of the group. Each object may be represented in the input by a plurality of vertices. The plurality of objects may be drawn into a frame buffer of the GPU such that a topmost object at each pixel in the frame buffer determines a color and an opacity of the pixel with respect to the other objects in the knockout group. In drawing the plurality of objects of the knockout group into the frame buffer of the GPU, program code may be executed by the GPU.

According to one embodiment, a depth buffer of the GPU may be used to distinguish among each of the objects in the knockout group. Each vertex of each object may be assigned a suitable depth value. A z-test function of the GPU may be configured to discard any new pixel with a depth value less than the corresponding depth value for that pixel in the depth buffer. As each object in the knockout group is drawn, the z-test may be applied to determine which pixels (if any) of the object should be drawn. If a new pixel has a depth value less than the value of the corresponding pixel in the depth buffer, then the new pixel is discarded and not drawn to the frame buffer. If a new pixel has a depth value greater than or equal to the value of the corresponding pixel in the depth buffer, then the new pixel is drawn to the frame buffer of the GPU, and the depth value for the corresponding pixel in the depth buffer is updated.

Figure 1:
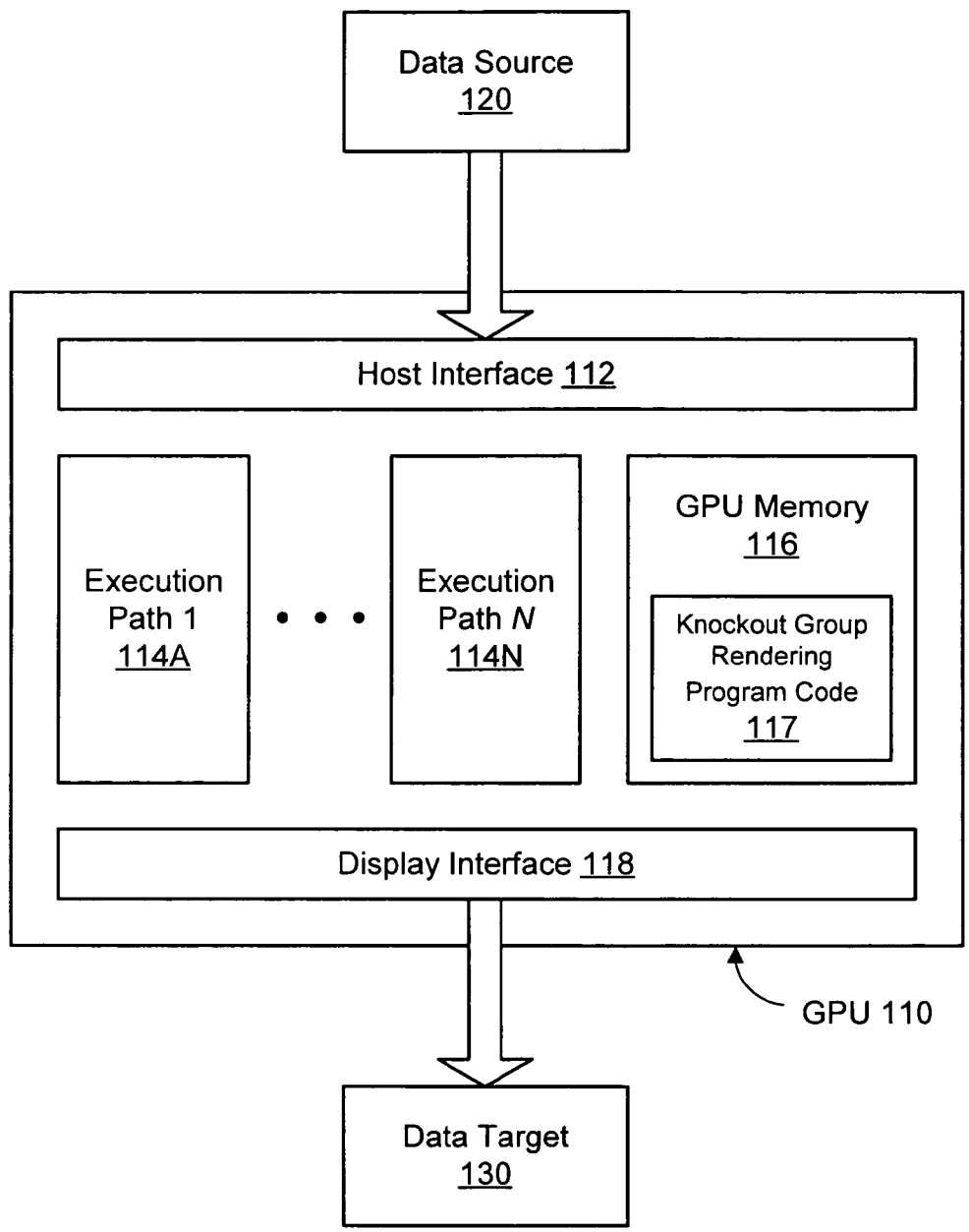
FIG. 1 is a block diagram illustrating one embodiment of a system configured to render knockout groups using a GPU.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 7:
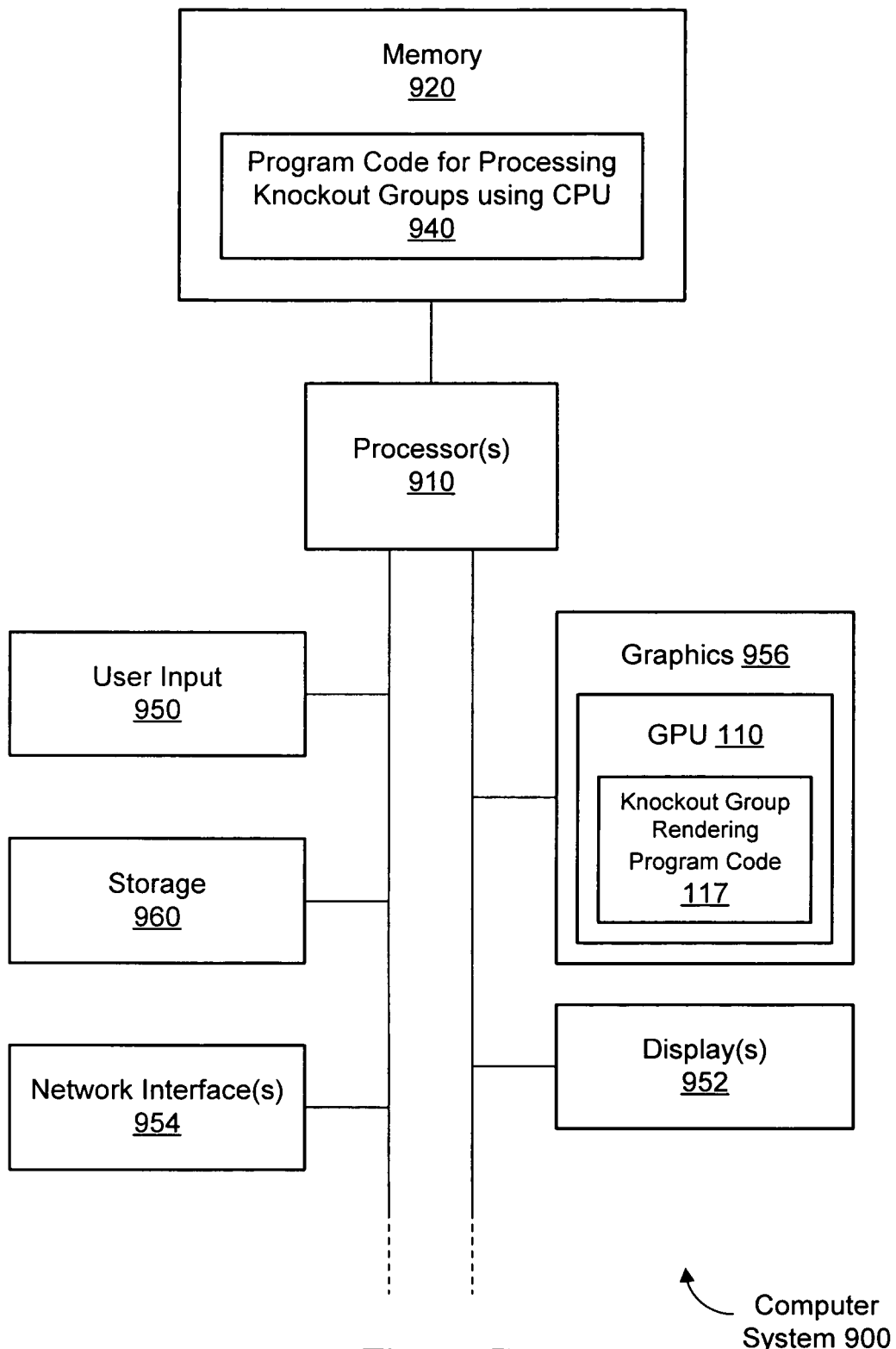
FIG. 7 is a block diagram illustrating constituent elements of a computer system that is configured to implement embodiments of the system and method for rendering knockout groups.

To reduce demands on central processing units (CPUs) of computer systems, GPUs may be used to perform aspects of operations to render knockout groups. FIG. 1 is a block diagram illustrating one embodiment of a system configured to render knockout groups on a GPU according to the techniques described herein. A graphics processing unit (GPU) 110, also referred to herein as a graphics processor, may comprise a dedicated graphics rendering device associated with a computer system. An example of a suitable computer system 900 for use with a GPU 110 is illustrated in FIG. 7. Turning back to FIG. 1, a GPU 110 may include numerous specialized components configured to optimize the speed of rendering graphics output. For example, a GPU 110 may include specialized components for rendering three-dimensional structures, for applying textures to surfaces, etc. For the sake of illustration, however, only a limited selection of components is shown in the example GPU 110 of FIG. 1. It is contemplated that GPU architectures other than the example architecture of FIG. 1 may be suitable for implementing the techniques described herein. Suitable GPUs 110 may be commercially available from vendors such as NVIDIA Corporation, ATI Technologies, and others.

A GPU 110 may be used in a removable graphics card that is coupled to a motherboard via a standardized bus (e.g., AGP or PCI Express). A GPU 110 may also be used in an integrated graphics solution (e.g., for use in some portable computers and lower-cost desktop computers). The GPU 110 may include a host interface 112 configured to communicate with a data source 120 (e.g., a communications bus and/or processor(s) 910 of a host computer system 900, or the host system itself). For example, the data source 120 may provide input data and/or executable program code to the GPU 110. In some embodiments, the host interface 112 may permit the movement of data in both directions between the GPU 110 and the data source 120. The GPU 110 may also include a display interface 118 for providing output data to a data target 130. For example, the data target 130 may comprise a display device 952, and the GPU 110 (along with other graphics components and/or interfaces 956) may "drive" the display 952 by providing graphics data at a particular rate from a frame buffer. The GPU 110 may implement one or more application programmer interfaces (APIs) that permit programmers to invoke the functionality of the GPU.

In one embodiment, the GPU 110 may include internal memory 116. The GPU memory 116, also referred to herein as "video memory" or "VRAM," may comprise random-access memory (RAM) which is accessible to other GPU components. As will be described in greater detail below, the GPU memory 116 may be used in some embodiments to store various types of data and instructions such as input data, output data, intermediate data, program instructions for performing various tasks, etc. In one embodiment, the GPU 110 may also be configured to access memory 920 of a host computer system 900 via the host interface 112 as shown in FIG. 7.

In one embodiment, the GPU 110 may include a plurality of execution paths 114A-114N as illustrated in FIG. 1. Using the plurality of execution paths 114A-114N, the GPU 110 may perform a plurality of tasks in a substantially parallel manner, such that a plurality of the execution paths 114A-114N are simultaneously in use. Each of the execution paths 114A-114N may perform tasks independent of the other execution paths 114A-114N. For example, each of the execution paths 114A-114N may operate on a different region (e.g., set of vertices or pixels) of an input artwork. The GPU 110 may be configured to process multi-channel input and produce multi-channel output. For example, the plurality of channels may represent RGBA data (data comprising separate channels for red, green, blue, and alpha data), vertices, textures, etc. In one embodiment, the GPU 110 may include additional components configured to control the plurality of execution paths 114A-114N, such as by distributing portions of the multi-channel input to individual execution paths.

The GPU 110 may also be configured to perform single-channel operations on single-channel data using only one of the plurality of execution paths 114A-114N. A single-channel operation may comprise an operation on non-vectorized input or input having only one channel (e.g., graphical data having only one channel). When the GPU 110 is used in this manner, however, the remaining execution paths may be idle.

By performing aspects of knockout group rendering on the GPU, the computational load on the host CPU may be reduced. Program code 117 comprising instructions for rendering knockout groups may be provided to the GPU 110. The program code may be stored in the GPU memory 116 and executed by one or more of the execution paths 114A-114D. The program code 117 may be configured to fetch and process a plurality of channels of input data in a parallel manner. In one embodiment, the program code 117 may be provided to the GPU 110 by the CPU 910 or other components of the computer system shown in FIG. 7. In another embodiment, the program code 117 may be native to the GPU 110.

The program code 117 may comprise a vertex shader and/or a pixel shader. A vertex shader comprises program instructions that are executable by the GPU to determine properties (e.g., position) of a particular vertex. A vertex shader may expect input such as uniform variables (e.g., constant values for each invocation of the vertex shader) and vertex attributes (e.g., per-vertex data). A pixel shader comprises program instructions that are executable by the GPU to determine properties (e.g., color) of a particular pixel. A pixel shader may expect input such as uniform variables (e.g., constant values for each invocation of the pixel shader) and pixel attributes (e.g., per-pixel data). In rendering the knockout groups, both the vertex shader and the pixel shader may be executed at various points in the graphics pipeline. In various embodiments, default vertex processing and/or pixel processing may be performed by the GPU 110 in the absence of custom shaders 118 and 119.

Figure 2:
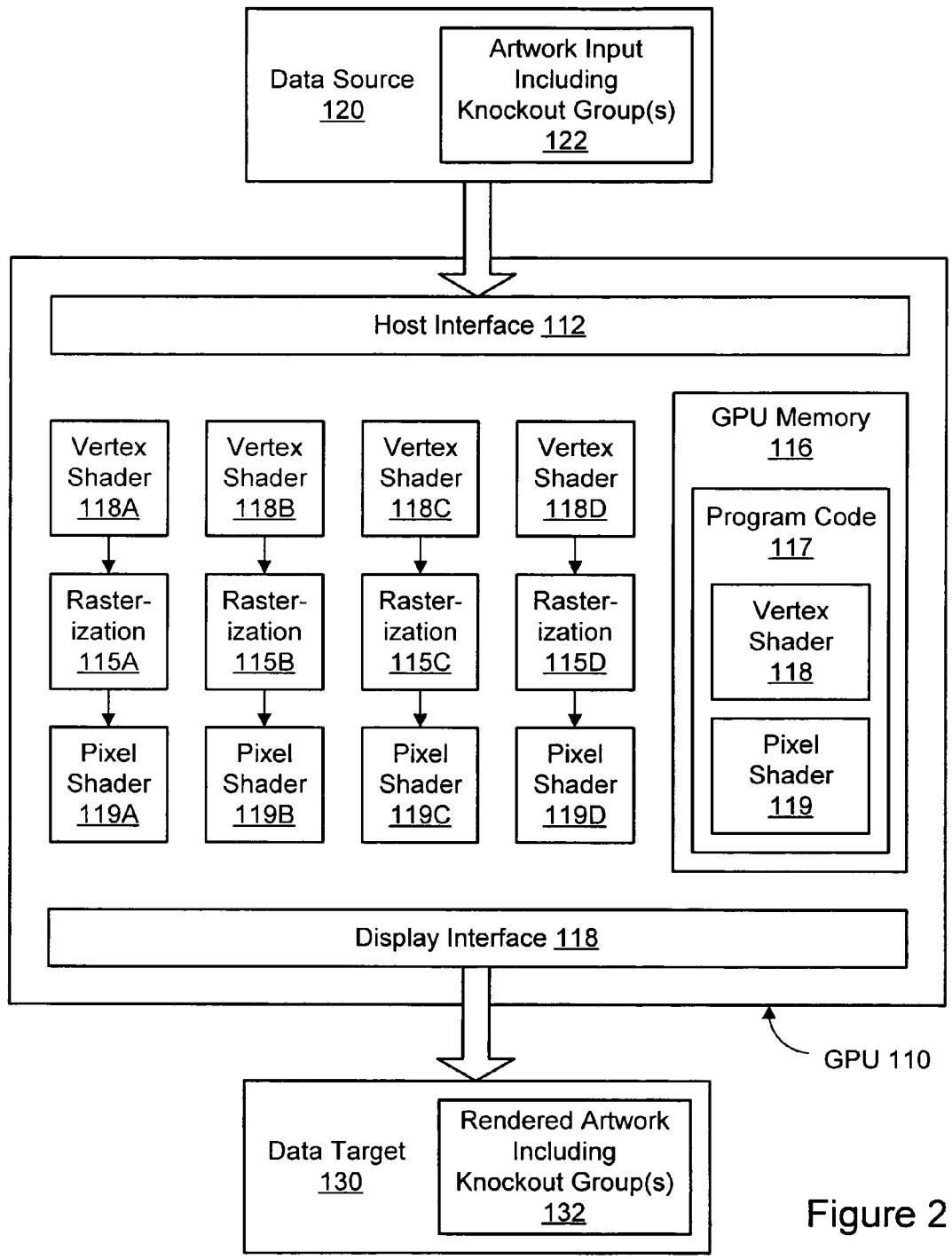
FIG. 2 is a block diagram illustrating one embodiment of a system configured to render knockout groups using multiple execution paths of a GPU.

FIG. 2 is a block diagram illustrating one embodiment of a system configured to render knockout groups using multiple (e.g., four) execution paths 114A-114D of a GPU. Artwork input 122 comprising one or more knockout groups (including a plurality of objects in each group) may be provided to the GPU 110 by a data source 120 such as a host CPU. In one embodiment, the objects may be tessellated on the CPU prior to being sent to the GPU. In one embodiment, the input 122 may be subdivided for distribution to different ones of the execution paths 114A-114D for efficient parallel processing. In each of the execution paths, a vertex shader 118A-118D may be executed to determine vertex values for each input vertex. In one embodiment, default vertex processing may be performed by the GPU 110 in the absence of a custom shader 118. Next, in a rasterization step 115A-115D, the vertex values may be converted to pixel values. In each of the execution paths, a pixel shader 119A-119D may then be executed on the pixel values to determine a final color of each pixel for the display output. In one embodiment, default pixel processing may be performed by the GPU 110 in the absence of a custom shader 119. The rendered knockout group(s), backdrop, and other artwork may be provided as output 132, e.g., for display on a display device coupled to the host computer system. In another embodiment, a different number of execution paths (i.e., as few as one) may be used to perform the knockout group rendering operation.

Typically, a GPU 110 does not permit the allocation of a frame buffer having an arbitrary number of channels. Therefore, the CPU-based approach for rendering knockout groups by allocating an extra channel for the shape alpha may not be applicable to rendering knockout groups using a GPU. In embodiments of the system and method for rendering knockout groups as described herein, a depth buffer of the GPU 110 may be used to distinguish among each of the objects in the knockout group. The depth buffer may also be referred to herein as the z-buffer. A z-test feature provided by the GPU 110 may be used to knock out an object's color for correct and efficient rendering of a knockout group. Using the systems and methods described herein, the GPU 110 may be used to render a knockout group without allocating multiple render targets, without using multiple drawing passes, and without excessive context switching between render targets.

Figure 3:
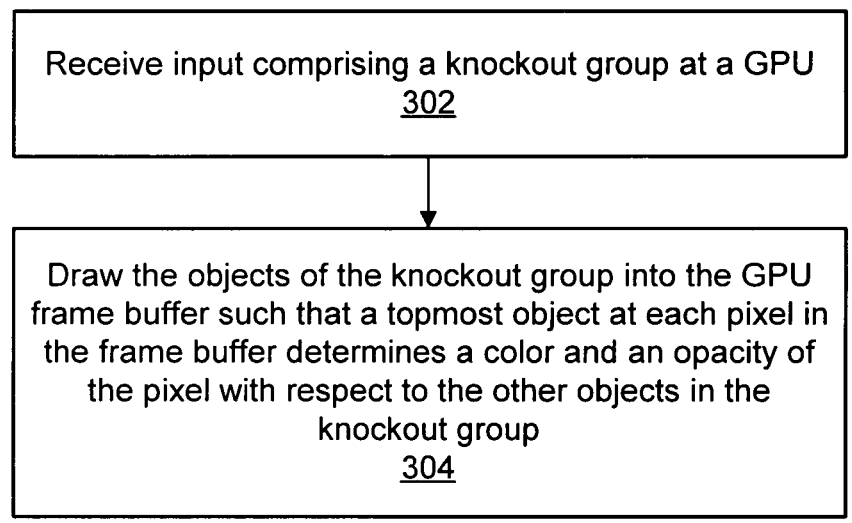
FIG. 3 is a flow diagram illustrating a method for rendering a knockout group using a GPU according to one embodiment.

FIG. 3 is a flow diagram illustrating a method for rendering a knockout group using a GPU according to one embodiment. As shown in block 302, input 122 comprising at least one knockout group may be received at the GPU 110. The knockout group may comprise a plurality of objects that are ordered by paint order. As used herein, the "paint order" or "drawing order" is an order in which objects (e.g., overlapping objects) are painted or drawn. In a knockout group, the objects may be composited with an initial background of the group rather than with each other. Each object may be represented in the input by a plurality of vertices. As shown in block 304, the plurality of objects may be drawn into a frame buffer of the GPU such that a topmost object at each pixel in the frame buffer determines a color and an opacity of the pixel with respect to the other objects in the knockout group. In drawing the plurality of objects of the knockout group into the frame buffer of the GPU, program code 117 may be executed by the GPU 110 as is described in greater detail below.

FIGS. 4A-4D illustrate a GPU memory 116 comprising a frame buffer 400, a depth buffer 410, and a knockout group 450 at various stages of the knockout rendering process according to one embodiment. The frame buffer 400 may comprise a two-dimensional array of pixels. Typically, the dimensions of the frame buffer are the same as those of the target display. The depth buffer 410 may comprise a two-dimensional array of depth (z) values. In one embodiment, the depth buffer may have the same dimensions as the frame buffer such that there is a one-to-one correspondence between a pixel in the frame buffer and a pixel in the depth buffer. The GPU 110 may comprise a z-test or z-culling feature that can be configured to compare the depth of overlapping objects and choose the closer object.

Figure 5:
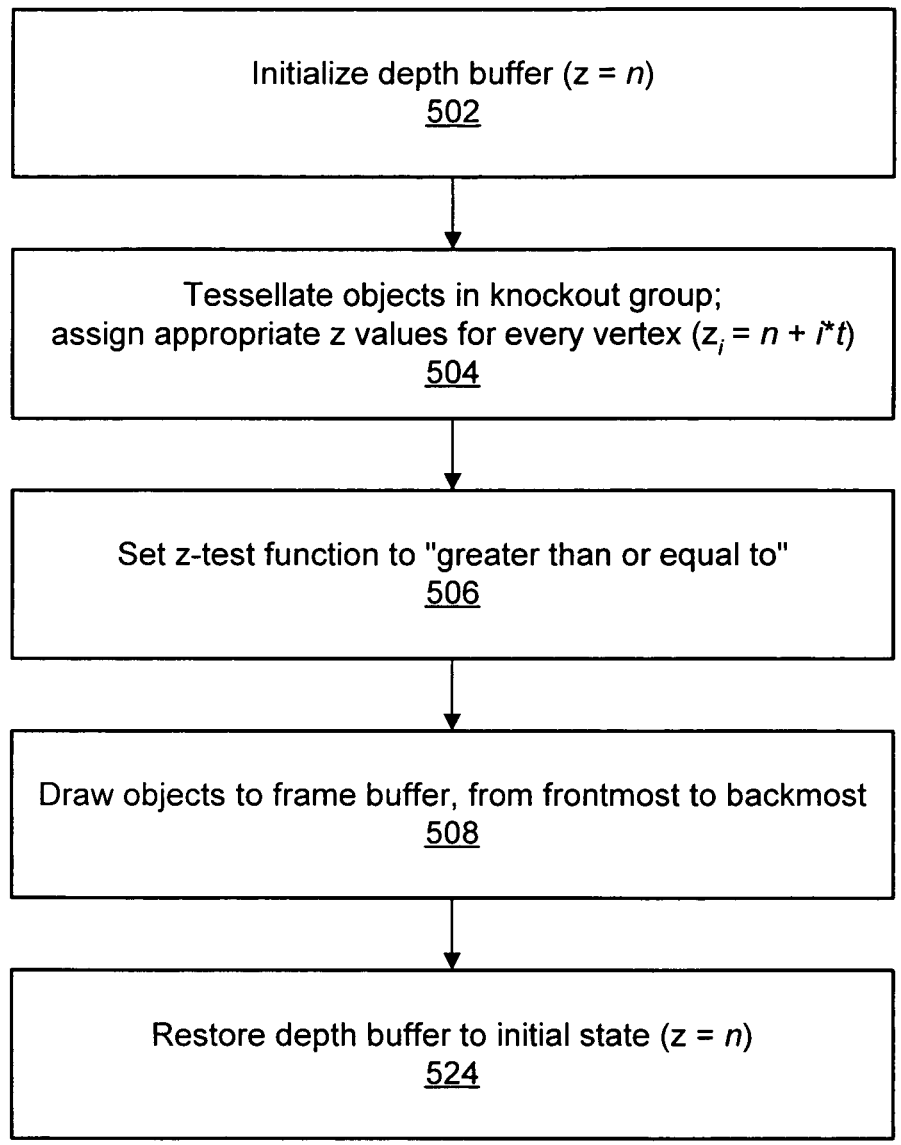
FIG. 5 is a flow diagram illustrating a method for rendering a simple knockout group using a GPU according to one embodiment.

In one embodiment, knockout groups with objects comprising simple fill and/or stroke (i.e., outline) properties may utilize a simpler rendering technique for faster performance. FIG. 5 is a flow diagram illustrating a method for rendering a simple knockout group using a GPU according to one embodiment. In one embodiment, the method shown in FIG. 5 may be used to render knockout groups having objects whose shape alpha property is a maximum value (e.g., 1.0). It is contemplated that many knockout groups will meet this criterion.

Figure 4A:
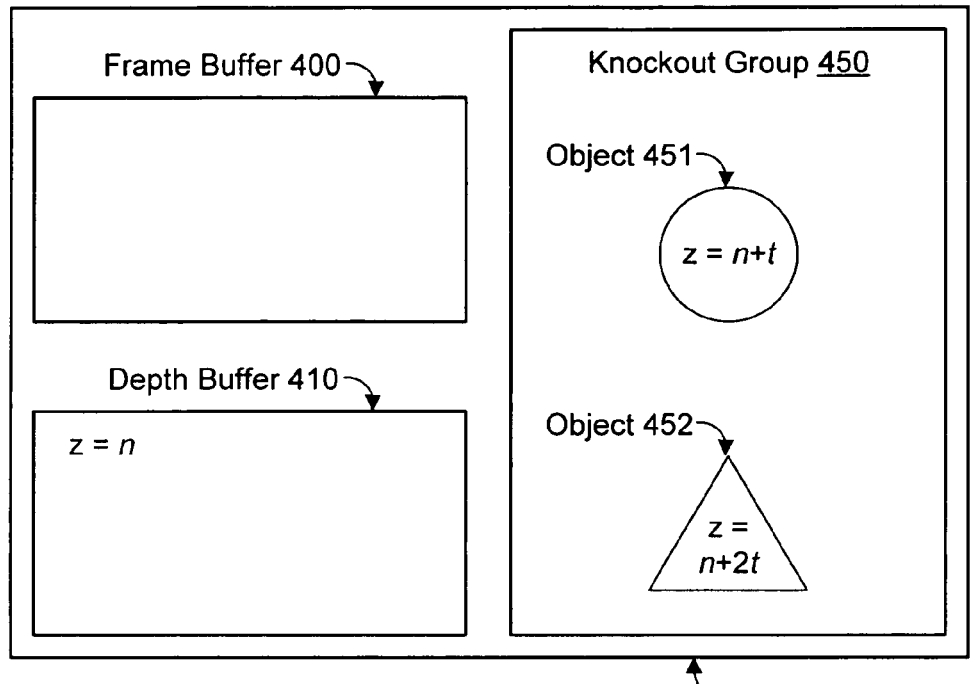
FIGS. 4A-4D illustrate a GPU memory comprising a frame buffer, a depth buffer, and a knockout group at various stages of the knockout rendering process according to one embodiment.

As shown in block 502, initial values may be set for the z-buffer 410 of the GPU 110 prior to rendering the artwork tree. Block 602 may be performed once for each artwork tree, regardless of the number of knockout groups (simple and complex) contained therein. In one embodiment, each pixel in the z-buffer may be initialized with a value n (e.g., 0). The initial value n may be referred to as the global-z value. This state of the z-buffer 410 is illustrated in FIG. 4A. Additionally, a z step-size value may be initialized with a value t. In one embodiment, t may be a default value such as 0.001.

As shown in block 504, the objects in a knockout group may be tessellated (i.e., reduced to polygons such as triangles). The tessellated objects may be represented as an array of vertices. Each vertex may store the coordinates of the vertex (x, y, z) and its color. The z value for the backmost object may be set as n+t, the z value for the next highest object may be set as n+2t, and so on. Generally, the z value for the $i^{th}$ object in the group is n+it. The objects in the vertex array may be stored in order, from the frontmost object to the backmost object. The tessellation may be performed on the CPU of the host system, and the CPU may then send the vertex array as input to the GPU 110 as shown in block 302 of FIG. 3.

As shown in block 506, the z-test function of the GPU 110 may be configured to discard any new pixel with a z-coordinate value less than the corresponding z-buffer value for that pixel. In one embodiment, the z-test function may therefore be set to "greater than or equal to." The z-test feature may be enabled with a suitable API call (e.g., using a graphics API such as Direct3D, OpenGL, etc.).

Figure 4B:
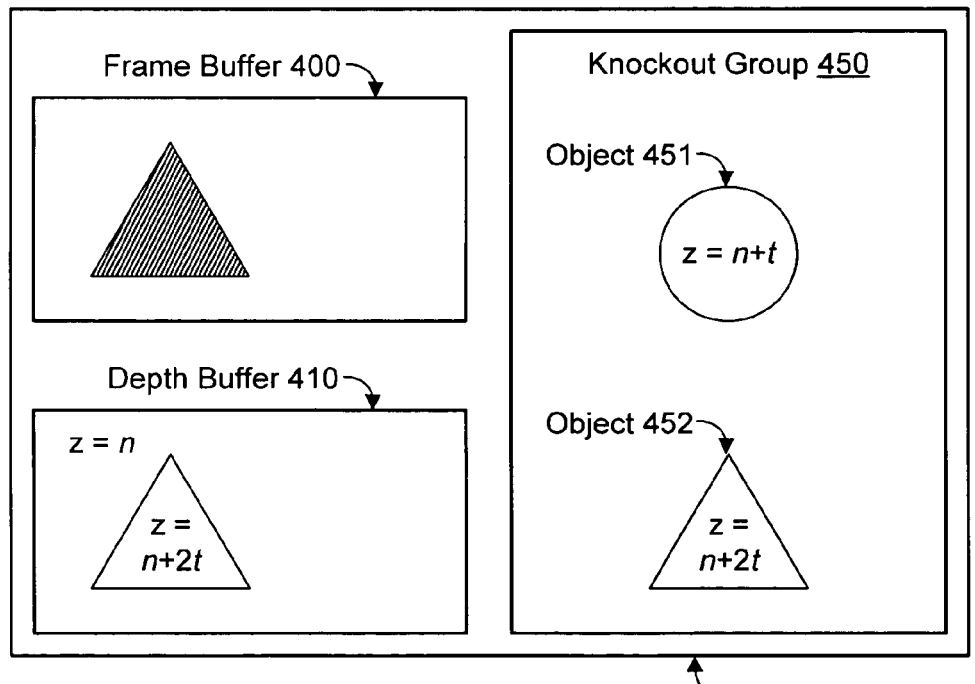
Figure 4C:
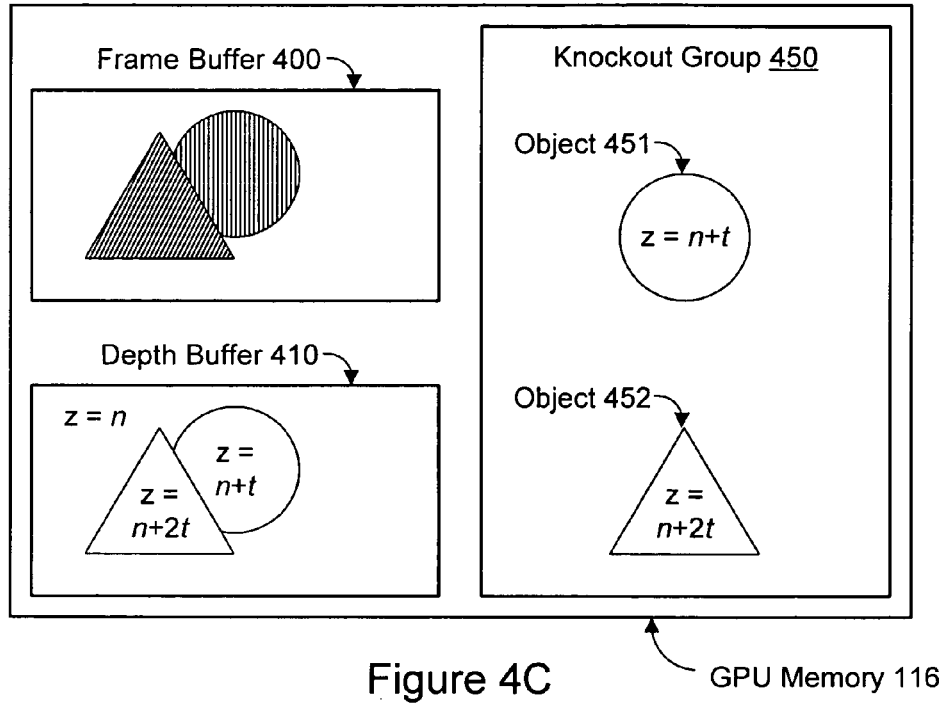

As shown in block 508, the objects in the knockout group may then be drawn to the frame buffer, object by object. In one embodiment, the objects in the knockout group may be drawn with a single API call to the GPU. The vertices representing the objects may be sent to the GPU in a single batch. The objects may be drawn in order, from the frontmost object (with larger z values) to the backmost object (with smaller z values). As each object is drawn, the z-test may be applied to determine which pixels (if any) of the object should be drawn. If a new pixel has a z-coordinate value less than the value of the corresponding pixel in the z-buffer, then the new pixel is discarded and not drawn to the frame buffer. If a new pixel has a z-coordinate value greater than or equal to the value of the corresponding pixel in the z-buffer, then the new pixel is drawn to the frame buffer of the GPU. The depth value for the corresponding pixel in the depth buffer may be updated with the depth value of the drawn pixel. For example, FIG. 4B illustrates the state of the frame buffer 400 and z-buffer 410 after drawing a first (topmost) object 452 having a z value of n+2t. FIG. 4C illustrates the same example after drawing a second object 451 having a z value of n+t.

Figure 4D:
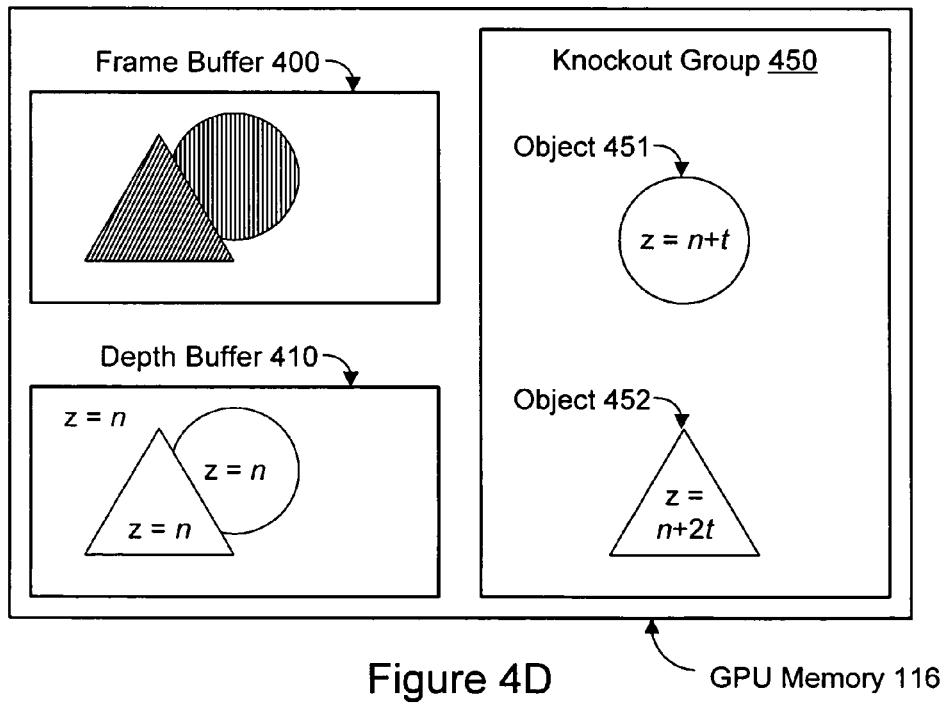

By using the z-test feature in this manner, portions of back objects that are overlapped by front objects are correctly knocked out in the final artwork. At any given point, only the topmost object enclosing the point contributes to the final color and opacity of the group as a whole while interacting with the group's backdrop in a usual manner. As shown in block 524, after encountering all the objects in the knockout group, the contents of the z-buffer may be restored to their initial state by assigning each pixel the initial global-z value n. This state of the z-buffer 410 is illustrated in FIG. 4D. In one embodiment, elements of FIG. 5 such as blocks 504, 508, and 524 may be performed again for each simple knockout group in the artwork tree.

Figure 6:
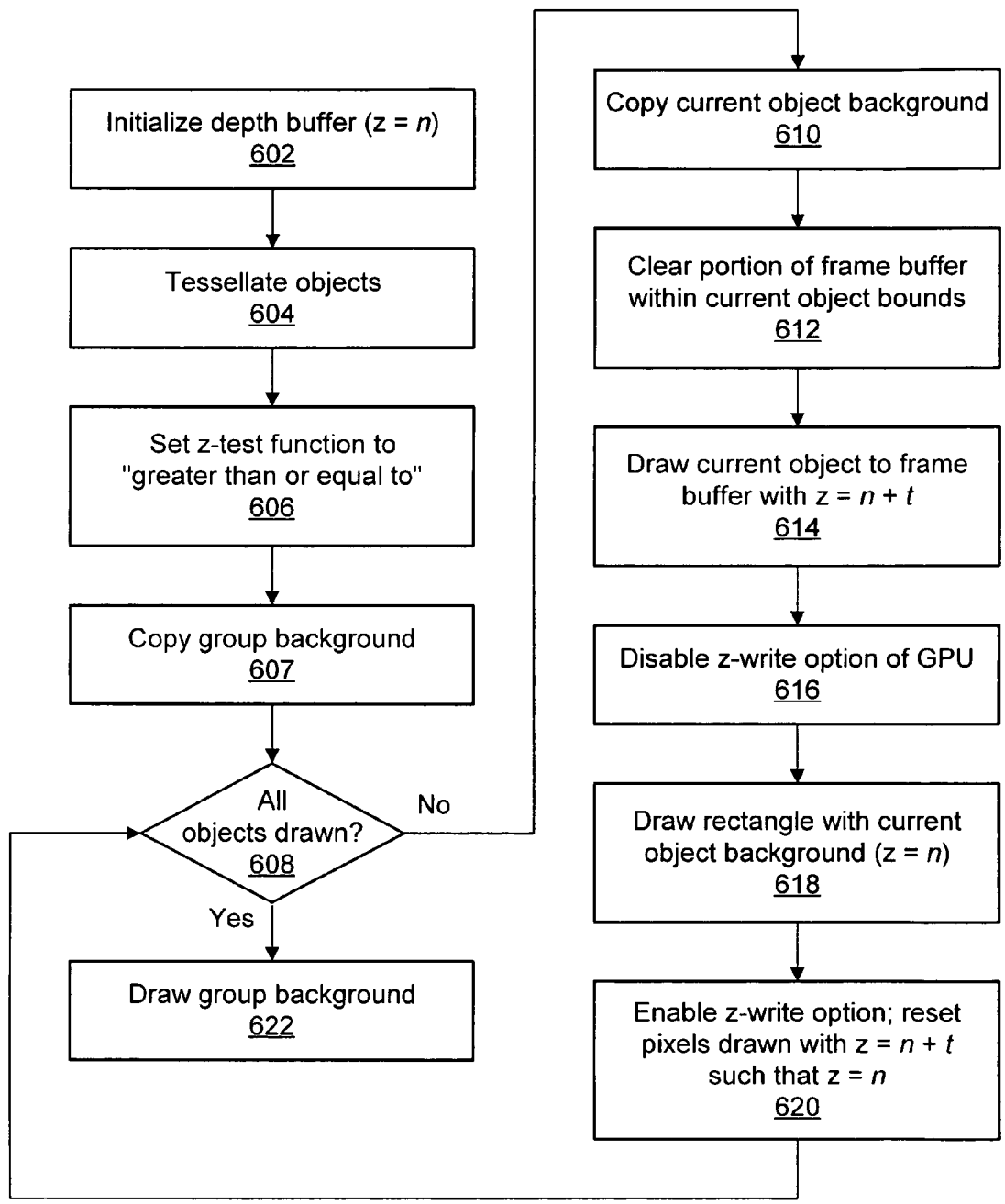
FIG. 6 is a flow diagram illustrating a method for rendering a more complex knockout group using a GPU according to one embodiment.

In one embodiment, knockout groups with objects that are not limited to simple fill and/or stroke properties may utilize a more complex rendering technique than the technique illustrated in FIG. 5. FIG. 6 is a flow diagram illustrating a method for rendering a more complex knockout group using a GPU according to one embodiment. The fill and/or stroke properties of one or more of the objects in a complex knockout group may include transparency attributes, clipping attributes, and/or other complex attributes. One or more of the objects in a complex knockout group may comprise other objects or knockout groups. In one embodiment, the method shown in FIG. 6 may be used to render knockout groups having objects whose shape alpha property is a maximum value (e.g., 1.0). Again, it is contemplated that many knockout groups will meet this criterion.

As shown in block 602, initial values may be set for the z-buffer of the GPU 110 prior to rendering the artwork tree. Block 602 may be performed once for each artwork tree, regardless of the number of knockout groups (simple and complex) contained therein. In one embodiment, each pixel in the z-buffer may be initialized with a value n (e.g., 0). The initial value n may be referred to as the global-z value. Additionally, a z step-size value may be initialized with a value t. In one embodiment, t may be a default value such as 0.001.

As shown in block 604, the objects in a knockout group may be tessellated (i.e., reduced to polygons such as triangles). The tessellated objects may be represented as a plurality of vertices. Each vertex may store the two-dimensional coordinates of the vertex (x, y) and its color. In contrast to the method shown in FIG. 5, the z values of the vertices for an object in a complex knockout group may be assigned dynamically on the GPU 110 as described below. The tessellation may be performed on the CPU of the host system, and the CPU may then send the vertices as input to the GPU 110 as shown in block 302 of FIG. 3. In one embodiment, each object in the complex knockout group may be sent to the GPU 110 one at a time.

As shown in block 606, the z-test function of the GPU 110 may be enabled and configured to discard any new pixel with a z-coordinate value less than the corresponding z-buffer value for that pixel. In one embodiment, the z-test function may therefore be set to "greater than or equal to." The z-test feature may be enabled with a suitable API call (e.g., using a graphics API such as Direct3D, OpenGL, etc.).

As shown in block 607, the contents of the frame buffer within the bounds of the knockout group may be copied when the knockout group is encountered in the artwork. If the bounds of the knockout group are less than the dimensions of the frame buffer, then less than the entire frame buffer may be copied. The contents of the frame buffer may be stored into a texture referred to as the group background. The group background may be stored in the GPU memory 116. In one embodiment, the portion of the frame buffer that was copied to the group background may be cleared.

As shown in block 608, the objects in the knockout group may then be drawn to the frame buffer, object by object. The objects may be drawn in paint order, from the backmost object to the frontmost object. As discussed above, the z-test may be applied to determine which pixels of an object should be drawn. To correctly paint the complex knockout group, blocks 610 through 620 may be performed for each object in the knockout group as it is encountered in the paint order.

As shown in block 610, the contents of the frame buffer within the bounds of the current object may be copied. These pixels may be copied to a texture referred to as the "current object background" which is stored in the GPU memory 116. As shown in block 612, the portion of the frame buffer within the bounds of the current object (i.e., the portion copied to the current object background) may have its color and opacity alpha cleared (e.g., all values set to zero). As shown in block 614, the current object may be drawn to the frame buffer (i.e., within the bounds cleared in block 612) with a z value of n+t.

As shown in block 616, the z-write option may be turned off with a call to the graphics API. In this mode, the z-test is still applied to new pixels, but the z-buffer will not actually be modified. As shown in block 618, a rectangle may be drawn with the current object background mapped on to it and such that the rectangle fills the bounds of the current object. The rectangle may be drawn with a z value of n such that portions of the current object background that overlap with the current object are knocked out. As shown in block 620, the z-write option is turned back on, and any pixels drawn with z=n+t are reset to z=n.

After all the objects in the knockout group have been encountered, the frame buffer includes the knockout group without the group background. As shown in block 622, the group background is drawn over the knockout group bounds in the frame buffer and reverse-alpha-blended into the pixels drawn in blocks 608 through 620. The resulting frame buffer may then include the correctly rendered complex knockout group with respect to the pre-existing background. In one embodiment, elements of FIG. 6 such as blocks 604 and 607 through 622 may be performed again for each complex knockout group in the artwork tree.

In one embodiment, the methods illustrated in FIGS. 5 and 6 may be used together to render both simple and complex knockout groups in the same artwork. For example, if an object in a first (i.e., complex) knockout group includes a second (e.g., simple) knockout group, the second knockout group may be correctly rendered by assigning its starting base z value to be higher than that of the first knockout group. In this manner, the method illustrated in FIG. 6 may be used recursively to draw nested knockout groups.

In various embodiments, the blocks shown in FIGS. 3, 5, and 6 may be performed in a different order than the illustrated order. In FIGS. 3, 5, and 6, any of the operations described in the blocks may be performed programmatically (i.e., by a computer according to a computer program). In FIGS. 3, 5, and 6, any of the operations described in the blocks may be performed automatically (i.e., without user intervention).

FIG. 7 is a block diagram illustrating constituent elements of a computer system 900 that is configured to implement embodiments of the system and method disclosed herein for rendering knockout groups using a GPU 110. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows™ from Microsoft Corporation, MacOS™ from Apple Corporation, or any other operating system that enables the operation of software on a hardware platform. The processor(s) 910 may be coupled to one or more of the other illustrated components, such as a memory 920, by at least one communications bus.

In one embodiment, the GPU 110 may be included in a specialized graphics card or other graphics component 956 that is coupled to the processor(s) 910. Additionally, the computer system 900 may include one or more displays 952. In one embodiment, the display(s) 952 may be coupled to the graphics card 956 for display of data provided by the graphics card 956.

Program instructions 940 that may be executable by the processor(s) 910 to implement aspects of the techniques described herein may be partly or fully resident within the memory 920 at the computer system 900 at any point in time. As is described with reference to FIGS. 1 and 2, another set of program instructions 117 may be provided to the GPU 110 for rendering knockout groups on the GPU 110. The memory 920 may be implemented using any appropriate medium such as any of various types of ROM or RAM (e.g., DRAM, SDRAM, RDRAM, SRAM, etc.), or combinations thereof. The program instructions 940 may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions 940 may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 7, as illustrated by the ellipsis shown.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   receiving input at a graphics processing unit (GPU) of a host computer system, wherein the input is sent to the GPU according to at least one central processing unit (CPU) of the host computer system, wherein the input comprises a knockout group and a background, wherein the knockout group comprises a plurality of objects that are ordered by paint order, wherein the plurality of objects comprises a respective topmost object and one or more additional objects at each of one or more locations enclosed by the knockout group;
   drawing the background into a frame buffer of the GPU; and
   drawing the plurality of objects in the knockout group into the frame buffer of the GPU, comprising, for each pixel in the frame buffer at the one or more locations, determining a color and an opacity of the pixel based on a color and an opacity of the respective topmost object at the pixel and based on a color and an opacity of the background at the pixel and not based on a color and an opacity of any of the one or more additional objects which are overlapped by the topmost object at the pixel.

2. The method as recited in claim 1, further comprising:
   configuring a z-test function of the GPU to discard a pixel of one of the plurality of objects having a depth value less than a depth value of a corresponding pixel in a depth buffer of the GPU.

3. The method as recited in claim 1, further comprising:
   initializing each pixel in a depth buffer of the GPU to an initial depth value;
   wherein each of the plurality of objects comprises one or more pixels, wherein each pixel of each of the plurality of objects comprises a depth value, and wherein drawing each pixel of the plurality of objects into the frame buffer of the GPU comprises:
   comparing a depth value of the pixel to the depth value of a corresponding pixel in the depth buffer; and
   drawing the pixel to the frame buffer and updating the depth value of the corresponding pixel in the depth buffer if the depth value of the pixel is greater than or equal to the depth value of the corresponding pixel in the depth buffer.

4. The method as recited in claim 1, further comprising:
   determining bounds of the knockout group based on the one or more locations enclosed by the knockout group;
   copying the background to a group background texture prior to drawing the plurality of objects into the frame buffer, wherein the background comprises a portion of the frame buffer within the bounds of the knockout group; and
   drawing the group background texture into the frame buffer after drawing the plurality of objects in the knockout group.

5. The method as recited in claim 1, wherein drawing each of the plurality of objects into the frame buffer comprises:
   determining bounds of the object;
   copying a portion of the frame buffer within the bounds of the object to an object background texture prior to drawing the object into the frame buffer; and
   drawing the object background texture into the frame buffer after drawing the object.

6. The method as recited in claim 1, further comprising:
   generating the input by tessellating the plurality of objects into a plurality of vertices, wherein each of the vertices comprises a depth value; and
   sending the input to the GPU in a batch.

7. The method as recited in claim 1, wherein the input is received at the GPU in a batch.

8. The method as recited in claim 1, wherein each of the plurality of objects comprises a shape alpha property having a maximum value.

9. The method as recited in claim 1, wherein the input comprises an additional knockout group, wherein the additional knockout group comprises a plurality of additional objects that are ordered by paint order, and wherein the method further comprises:
   drawing the plurality of additional objects into the frame buffer of the GPU, wherein the topmost object at each pixel in the frame buffer determines the color and an opacity of the pixel with respect to the other objects in the additional knockout group, and wherein the knockout group and the additional knockout group are encountered recursively.

10. A system, comprising:
a graphics processing unit (GPU);
memory coupled to the GPU, wherein the memory comprises a frame buffer, and wherein the memory is configured to store program instructions executable by the GPU to:
   receive input comprising a knockout group and a background, wherein the knockout group comprises a plurality of objects that are ordered by paint order, wherein the plurality of objects comprises a respective topmost object and one or more additional objects at each of one or more locations enclosed by the knockout group;
   draw the background into the frame buffer; and
   draw the plurality of objects in the knockout group into the frame buffer, wherein, for each pixel in the frame buffer at the one or more locations, the program instructions are executable by the GPU to determine a color and an opacity of the pixel based on a color and an opacity of the respective topmost object at the pixel and based on a color and an opacity of the background at the pixel and not based on a color and an opacity of any of the one or more additional objects which are overlapped by the topmost object at the pixel.

11. The system as recited in claim 10, wherein the GPU comprises a z-test function, wherein the memory comprises a depth buffer, and wherein the z-test function is configured to discard a pixel of one of the plurality of objects having a depth value less than a depth value of a corresponding pixel in the depth buffer.

12. The system as recited in claim 10, wherein memory comprises a depth buffer, wherein each of the plurality of objects comprises one or more pixels, wherein each pixel of each of the plurality of objects comprises a depth value, and wherein the program instructions are further executable by the GPU to:
   initialize each pixel in the depth buffer to an initial depth value;
   wherein, in drawing each pixel of the plurality of objects into the frame buffer of the GPU, the program instructions are further executable by the GPU to:
      compare a depth value of the pixel to the depth value of a corresponding pixel in the depth buffer; and
      draw the pixel to the frame buffer and updating the depth value of the corresponding pixel in the depth buffer if the depth value of the pixel is greater than or equal to the depth value of the corresponding pixel in the depth buffer.

13. The system as recited in claim 10, wherein the program instructions are further executable by the GPU to:
   determine bounds of the knockout group based on the one or more locations enclosed by the knockout group;
   copy the background to a group background texture prior to drawing the plurality of objects into the frame buffer, wherein the background comprises a portion of the frame buffer within the bounds of the knockout group; and
   draw the group background texture into the frame buffer after drawing the plurality of objects in the knockout group.

14. The system as recited in claim 10, wherein, in drawing each of the plurality of objects into the frame buffer, the program instructions are further executable by the GPU to:
   determine bounds of the object;
   copy a portion of the frame buffer within the bounds of the object to an object background texture prior to drawing the object into the frame buffer; and
   draw the object background texture into the frame buffer after drawing the object.

15. The system as recited in claim 10, further comprising:
at least one central processing unit (CPU); and
additional memory coupled to the at least one CPU, wherein the additional memory is configured to store additional program instructions executable by the at least one CPU to:
   generate the input by tessellating the plurality of objects into a plurality of vertices, wherein each of the vertices comprises a depth value; and
   send the input to the GPU in a batch.

16. The system as recited in claim 10, wherein the input is received at the GPU in a batch.

17. The system as recited in claim 10, wherein each of the plurality of objects comprises a shape alpha property having a maximum value.

18. The system as recited in claim 10, wherein the input comprises an additional knockout group, wherein the additional knockout group comprises a plurality of additional objects that are ordered by paint order, and wherein the program instructions are further executable by the GPU to:
   draw the plurality of additional objects into the frame buffer, wherein the topmost object at each pixel in the frame buffer determines the color and an opacity of the pixel with respect to the other objects in the additional knockout group, and wherein the knockout group and the additional knockout group are encountered recursively.

19. A non-transitory, computer-readable storage medium, comprising program instructions, wherein the program instructions are computer-executable to implement:
   receiving input at a graphics processing unit (GPU) of a host computer system, wherein the input is sent to the GPU according to at least one central processing unit (CPU) of the host computer system, wherein the input comprises a knockout group and a background, wherein the knockout group comprises a plurality of objects that are ordered by paint order, wherein the plurality of objects comprises a respective topmost object and one or more additional objects at each of one or more locations enclosed by the knockout group;
   drawing the background into a frame buffer of the GPU; and
   drawing the plurality of objects in the knockout group into the frame buffer of the GPU, comprising, for each pixel in the frame buffer at the one or more locations, determining a color and an opacity of the pixel based on a color and an opacity of the respective topmost object at the pixel and based on a color and an opacity of the background at the pixel and not based on a color and an opacity of any of the one or more additional objects which are overlapped by the topmost object at the pixel.

20. The non-transitory, computer-readable storage medium as recited in claim 19, wherein the program instructions are further computer-executable to implement:
   configuring a z-test function of the GPU to discard a pixel of one of the plurality of objects having a depth value less than a depth value of a corresponding pixel in a depth buffer of the GPU.

21. The non-transitory, computer-readable storage medium as recited in claim 19, wherein the program instructions are further computer-executable to implement:
  initializing each pixel in a depth buffer of the GPU to an initial depth value;
  wherein each of the plurality of objects comprises one or more pixels, wherein each pixel of each of the plurality of objects comprises a depth value, and wherein drawing each pixel of the plurality of objects into the frame buffer of the GPU comprises:
    comparing a depth value of the pixel to the depth value of a corresponding pixel in the depth buffer; and
    drawing the pixel to the frame buffer and updating the depth value of the corresponding pixel in the depth buffer if the depth value of the pixel is greater than or equal to the depth value of the corresponding pixel in the depth buffer.

22. The non-transitory, computer-readable storage medium as recited in claim 19, wherein the program instructions are further computer-executable to implement:
  determining bounds of the knockout group based on the one or more locations enclosed by the knockout group;
  copying the background to a group background texture prior to drawing the plurality of objects into the frame buffer, wherein the background comprises a portion of the frame buffer within the bounds of the knockout group; and
  drawing the group background texture into the frame buffer after drawing the plurality of objects in the knockout group.

23. The non-transitory, computer-readable storage medium as recited in claim 19, wherein, in drawing each of the plurality of objects into the frame buffer, the program instructions are further computer-executable to implement:
  determining bounds of the object;
  copying a portion of the frame buffer within the bounds of the object to an object background texture prior to drawing the object into the frame buffer; and
  drawing the object background texture into the frame buffer after drawing the object.

24. The non-transitory, computer-readable storage medium as recited in claim 19, wherein the program instructions are further computer-executable to implement:
  generating the input by tessellating the plurality of objects into a plurality of vertices, wherein each of the vertices comprises a depth value; and
  sending the input to the GPU in a batch.

25. The non-transitory, computer-readable storage medium as recited in claim 19, wherein the input is received at the GPU in a batch.

26. The non-transitory, computer-readable storage medium as recited in claim 19, wherein each of the plurality of objects comprises a shape alpha property having a maximum value.

27. The non-transitory, computer-readable storage medium as recited in claim 19, wherein the input comprises an additional knockout group, wherein the additional knockout group comprises a plurality of additional objects that are ordered by paint order, and wherein the program instructions are further computer-executable to implement:
  drawing the plurality of additional objects into the frame buffer of the GPU, wherein the topmost object at each pixel in the frame buffer determines the color and an opacity of the pixel with respect to the other objects in the additional knockout group, and wherein the knockout group and the additional knockout group are encountered recursively.

* * * * *